Dec. 31, 1929.  K. B. JOHN ET AL  1,741,312
TABLET MACHINE
Filed June 21, 1928  2 Sheets-Sheet 2
FIG 3
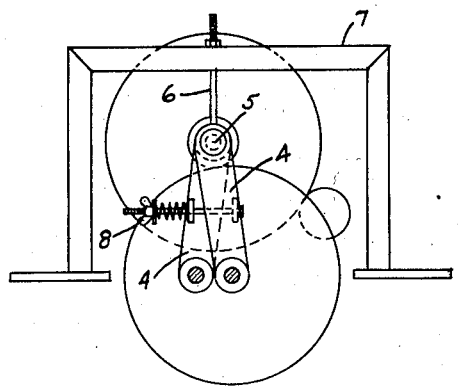
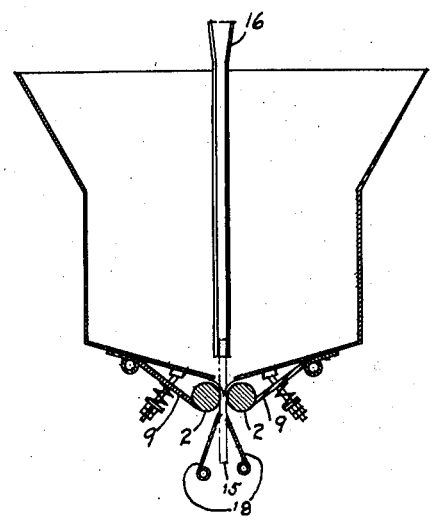
FIG 4
Kenneth B. John
Carl W. Coslow
Christian J. Schwindt
    INVENTORS
BY *Robert Ames Norton*
ATTORNEY.

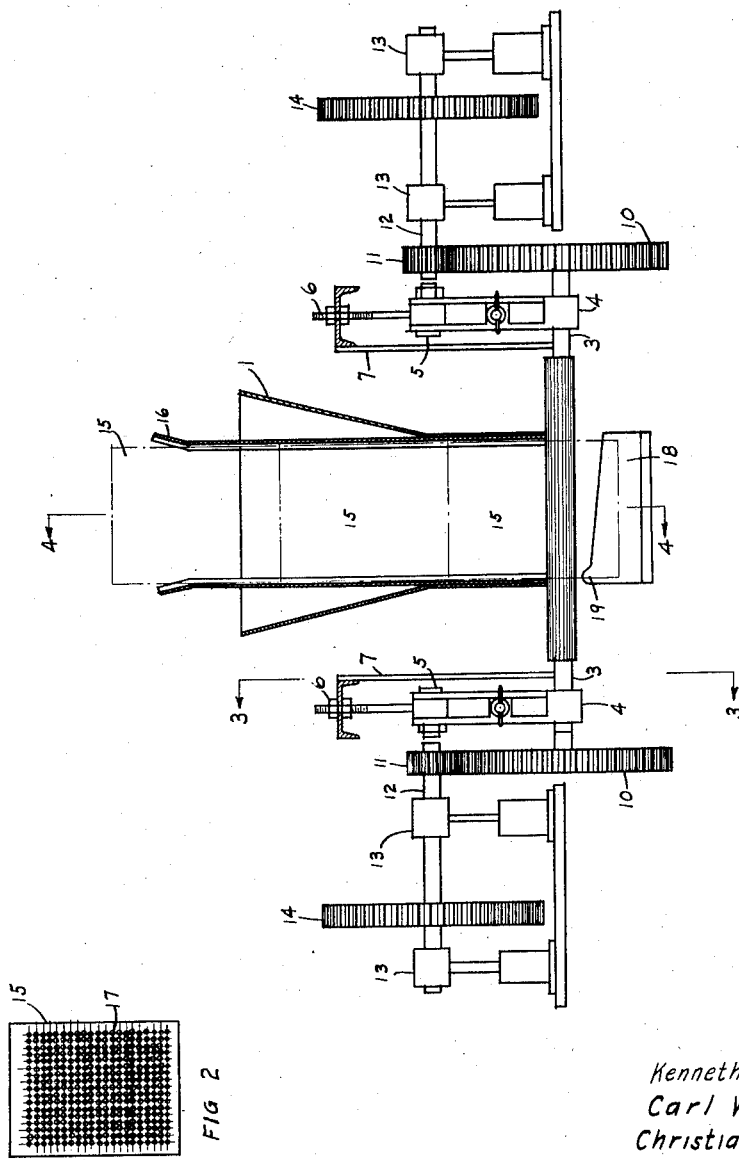

Patented Dec. 31, 1929

1,741,312

UNITED STATES PATENT OFFICE

KENNETH B. JOHN, CARL W. COSLOW, AND CHRISTIAN J. SCHWINDT, OF PITTSBURGH, PENNSYLVANIA, ASSIGNORS, BY MESNE ASSIGNMENTS, TO THE SELDEN RESEARCH & ENGINEERING CORPORATION, OF PITTSBURGH, PENNSYLVANIA, A CORPORATION OF DELAWARE

TABLET MACHINE

Application filed June 21, 1928. Serial No. 287,170.

This invention relates to tablet machines for making cylindrical and similar pellets from moist pulverulent material.

Pellets in the form of cylindrical or similar pellets are made from various materials, usually damp powdered materials. These tablets are used as a convenient form for administering medicinal preparations and can be used as contact masses to be used in catalytic reactions where large quantities of finely divided diluents, such as kieselguhr, are used. Such machines frequently use plates with accurate perforations, which perforations are filled with the adherent powdered material and then subjected to pressure from one side to press the pellets into compact form in the plates or dies.

In order to obtain the best results, particularly for catalysts to be used as contact masses, it is necessary to exert considerable pressure equally from both sides and rollers are used in the present invention for exerting pressure on the material in the plate and are capable of swinging apart as the plates pass through them, especially when the filling of the perforations in the plates is accomplished by passing the latter downwardly through a hopper filled with the powdered material which method is adopted in the apparatus of the present invention. It is an advantage of the present invention that the rollers can spread apart without in the slightest affecting their drive and without necessitating the use of flexible drives, such as chains, belts, and the like, which have hitherto been necessary where a considerable movement of the rollers were required. In its more specific embodiments the present invention includes automatic plate feeding means which are of importance in large scale production.

According to the present invention the rollers are driven by gears meshing with other gears on parallel shafts and the rollers are journaled in frames which are capable of rocking around an axis coinciding with the axis of the drive shaft so that no matter how far the rolls swing apart the distance from the center of the roll axis to the center of the drive shaft remains constant and therefore the driving and driven gears remain continuously in mesh on a pitch circle of unvarying diameter.

In the more specific embodiment of the invention a central plate guide is positioned in the powder hopper so that plates can slide through by gravity and emerge from the guide into the powdered material at a point less than a plate length above the compacting rolls. In the preferred embodiment the invention contemplates providing a continuous feed of powdered material to the plates as the latter pass through it.

The invention will be described in greater detail in connection with the manufacture of diluted zeolite contact masses in which kieselguhr moistened with a zeolite gel is formed into cylindrical pellets. The specific embodiments of the invention are shown in the figures of the drawings, in which Fig. 1 is a vertical section through a tablet machine embodying the features of the present invention;

Fig. 2 is a plan view of a plate;

Fig. 3 is a vertical section taken at right angles to Fig. 1 along the line 3—3; and Fig. 4 is a vertical section at right angles to Fig. 1 taken along the line 4—4.

The machine consists essentially in a hopper 1, and compacting rolls 2 which may be smooth or ribbed. The rolls are mounted on shaft 3, passing through frames 4, which frames are rotatable about pins 5, adjustably supported by the threaded rods 6 in frames 7 which are rigidly attached to the main machine frame. The frames 4 are drawn together by the adjustable springs 8. Suitable spring pressed scrapers 9 (see Fig. 4) are provided to clean the rolls from adherent powdered material. It is vitally essential with diluted zeolite contact masses that the rolls be scraped clean of adherent material as otherwise they will not properly compact the material in the following plates and will tend to smear the material over the plate surface, thus producing pellets of unsatisfactory physical structure and surface. Each roll shaft carries a gear 10, the gears for both rolls being on either the same end or opposite ends, the latter case being shown in Fig. 1. The gears are in turn driven by pinions 11, meshing therewith, which pinions are keyed to shafts 12 coaxial with the pins 5. These shafts 12 are suitably journaled in mountings 13 on the main frame and may be driven through gears 14 or by any other suitable means. For simplicity's sake, the gears on the ends of the rolls are shown on opposite ends of the roll shafts and two gears 14 are shown. In practice it is generally simpler to use a single driving source and have both gears 10 on the same side of the machine. The principle of operation, of course, is identical.

In operation the hopper is filled with zeolite-kieselguhr powder and plates 15 pass down through the plate magazine 16 (see Figs. 1 and 4) passing from the plate magazine through the powdered material at the bottom of the hopper and then between the rolls 2. The powder which fills the perforations 17 in the plates 15 to overflowing is compressed into the perforations by the rollers, thus forming firm pellets in the plate. Any surplus powder is scraped from the rollers by the scrapers 9 (see Fig. 4). The plates after passing through the rollers can then be placed by hand on a plate with suitable projections registering with the perforations in order to press out the pellets formed.

It will be apparent that the machine operates simply and reliably, the rollers 2 always being in tight contact either with special separators or with the plates as they pass through and the machine operates uninterruptedly with plates of any thickness. The plate feeding magazine permits more rapid operation as the plates are fed by gravity when in the correct position but where large production is not essential the magazine may be dispensed with and the plates may be placed in the hopper by hand. It is usually necessary to agitate the powder in order to keep it in contact with the emerging plates and to prevent any tendency to forming lumps. This may be done manually or any suitable jarring means may be employed, such as for example a tapper which continuously taps the side of the hopper 1. These devices are of well known type and are not shown in the drawings.

It is desirable to clean the plates of adherent material before removing the pellets. This may be done by hand, but is preferably effected by suitable scraping means incorporated in the tablet machine. In the drawing these means are shown diagrammatically as two spring pressed knives 18 (see Figs. 1 and 4). The knives are provided with inclined cutting edges, and each knife possesses a lip 19, bent back so that the plate striking the lip 19 forces the knives apart sufficiently to permit it to pass therethrough. The sharp knife edges clean off superfluous material and the pellets can then be discharged as described above. Any other suitable scraping means may be used, such as revolving knives, revolving brushes, and the like. We have found that knives are very satisfactory with diluted zeolite contact masses, but for other pulverulent material different devices sometimes present advantages, and the skilled engineer will use the scraping device best adapted for use with the material from which he is preparing his pellets.

While it is a peculiar advantage of the present invention that it is possible to drive the machine entirely positively through gears without encountering any difficulties in meshing with different roll separations, it should be understood that the machine can also be operated with flexible driving means, such as chains and belts, in which case the fact that the axes of the roll shafts swing about an axis coincident with that of the driving shaft keeps a uniform tension on the flexible driving means, a very great advantage although not as essential as in the case of gears for it is, of course, possible to operate machines in which the axes do not move in circles around the drive shaft when flexible driving means are used but, of course, a much less effective drive is obtained. The advantages of the present invention, therefore, are very marked even with highly flexible drives.

In the claims the expression "non-flexible drive" is used to cover the various types of gear drives or direct friction drives, and excludes flexible drives such as belt, chain, rope, and similar drives.

What is claimed as new is:

1. A tablet machine comprising in combination a hopper adapted to contain pulverulent material, means for feeding perforated plates edgewise through said hopper, a slot-like opening at the bottom of said hopper, a pair of movable rolls extending lengthwise of said slot, non-flexible driving means for positively driving said rolls, means for causing them to exert pressure on the plates passing therethrough, said rolls being capable of approaching and receding from each other without affecting the alignment of the drive.

2. A tablet machine comprising in combination a hopper adapted to contain pulverulent material, means for feeding perforated plates edgewise through said hopper, a slot-like opening at the bottom of said hopper, a pair of movable rolls extending lengthwise of said slot, means for positively driving said rolls, means for causing them to exert pressure on the plates passing therethrough, said rolls being driven by a gear train and being journaled in frames rotatable about an axle coincident with the axis of the driving gear.

Signed at Pittsburgh, Pa., this 18th day of June, 1928.

KENNETH B. JOHN.
CARL W. COSLOW.
CHRISTIAN J. SCHWINDT.